United States Patent
Maeda et al.

(10) Patent No.: US 12,107,735 B2
(45) Date of Patent: Oct. 1, 2024

(54) INFORMATION PROCESSING APPARATUS, INFORMATION PROCESSING METHOD, AND NON-TRANSITORY COMPUTER READABLE MEDIUM

(71) Applicant: KABUSHIKI KAISHA TOSHIBA, Tokyo (JP)

(72) Inventors: Tomonori Maeda, Kawasaki Kanagawa (JP); Hiroyoshi Haruki, Kawasaki Kanagawa (JP); Fukutomo Nakanishi, Tokyo (JP); Jun Kanai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/929,737

(22) Filed: Sep. 5, 2022

(65) Prior Publication Data

US 2023/0318928 A1  Oct. 5, 2023

(30) Foreign Application Priority Data

Mar. 17, 2022  (JP) ................. 2022-043201

(51) Int. Cl.
*H04L 41/142* (2022.01)
*H04L 41/14* (2022.01)
*H04L 41/149* (2022.01)

(52) U.S. Cl.
CPC .......... *H04L 41/142* (2013.01); *H04L 41/145* (2013.01); *H04L 41/149* (2022.05)

(58) Field of Classification Search
CPC .... H04L 41/149; H04L 41/142; H04L 41/145
USPC ........................................ 709/224
See application file for complete search history.

(56) References Cited

U.S. PATENT DOCUMENTS

| | | | |
|---|---|---|---|
| 9,798,629 B1 * | 10/2017 | Shilane | G06F 11/1466 |
| 2018/0091474 A1 * | 3/2018 | Tulasi | H04L 63/02 |
| 2018/0150125 A1 * | 5/2018 | HomChaudhuri | G06F 13/4282 |
| 2022/0051139 A1 * | 2/2022 | Tullberg | G06N 20/00 |
| 2023/0067096 A1 | 3/2023 | Maeda et al. | |

FOREIGN PATENT DOCUMENTS

| | | | | |
|---|---|---|---|---|
| EP | 3783856 A1 * | 2/2021 | | G06N 20/00 |
| JP | 2006-333089 A | 12/2006 | | |
| JP | 5506889 B2 | 5/2014 | | |
| JP | 2016-32203 A | 3/2016 | | |
| JP | 2023-34721 A | 3/2023 | | |

* cited by examiner

*Primary Examiner* — Suraj M Joshi
(74) *Attorney, Agent, or Firm* — Finnegan, Henderson, Farabow, Garrett & Dunner, LLP

(57) ABSTRACT

According to one embodiment, an information processing apparatus includes a communication amount predictor. The communication amount predictor acquires relation data in which a variation of a communication amount in a first environment including first devices of a plurality of function types is associated with a varied number of the first devices for each of the plurality of function types in a case where a number of first devices for each of the plurality of function types varies in the first environment. The communication amount predictor predicts a communication amount in a second environment including second devices of the plurality of function types on a basis of the relation data and a number of the second devices for each of the plurality of function types in the second environment.

14 Claims, 22 Drawing Sheets

FIRST CONFIGURATION INFORMATION 1010

|  | FIRST IDENTIFICATION INFORMATION (IP ADDRESS) | FUNCTION TYPE |
|---|---|---|
| FIRST ENVIRONMENT 11 | 192.168.0.100 | HMI |
|  | 192.168.0.200 | PLC |
| FIRST ENVIRONMENT 12 | 192.168.1.100 | HMI |
|  | 192.168.1.150 | PLC |
|  | 192.168.1.200 | PLC |
| FIRST ENVIRONMENT 13 | 192.168.1.100 | HMI |
|  | 192.168.1.150 | HMI |
|  | 192.168.1.200 | PLC |
| FIRST ENVIRONMENT 14 | 192.168.2.50 | HMI |
|  | 192.168.2.100 | HMI |
|  | 192.168.2.150 | PLC |
|  | 192.168.2.200 | PLC |

FIG. 4

| FIRST ENVIRONMENT DATA 3210 | | | | | | | |
|---|---|---|---|---|---|---|---|
| FIRST FUNCTION TYPE NUMBER INFORMATION 3010 | | | | | | | |
| HMI:1 (192.168.0.100) PLC:1 (192.168.0.200) | FIRST COMMUNICATION DATA 3110 | | | | | | |
| | | TRANSMISSION SOURCE ADDRESS | TRANSMISSION DESTINATION ADDRESS | TRANSMISSION SOURCE PORT | TRANSMISSION DESTINATION PORT | COMMUNICATION PROTOCOL | PAYLOAD |
| | PACKET 3111 | 192.168.0.100 | 192.168.0.200 | 8888 | 443 | TCP | 7384725745932870 |
| | PACKET 3112 | 192.168.0.200 | 192.168.0.100 | 443 | 8889 | TCP | 34523457932534 |
| | PACKET 3113 | 192.168.0.100 | 192.168.0.200 | 8888 | 443 | UDP | 2345295732894 |
| | PACKET 3114 | 192.168.0.200 | 192.168.0.100 | 443 | 8889 | UDP | 345782945783 |
| FIRST ENVIRONMENT DATA 3220 | | | | | | | |
| FIRST FUNCTION TYPE NUMBER INFORMATION 3020 | | | | | | | |
| HMI:1 (192.168.1.100) PLC:2 (192.168.1.150, 192.168.1.200) | FIRST COMMUNICATION DATA 3120 | | | | | | |
| | | TRANSMISSION SOURCE ADDRESS | TRANSMISSION DESTINATION ADDRESS | TRANSMISSION SOURCE PORT | TRANSMISSION DESTINATION PORT | COMMUNICATION PROTOCOL | PAYLOAD |
| | PACKET 3121 | 192.168.1.100 | 192.168.1.200 | 8888 | 443 | TCP | 7384725745932870 |
| | PACKET 3122 | 192.168.1.200 | 192.168.1.150 | 443 | 8889 | TCP | 3452345793253 |
| | PACKET 3123 | 192.168.1.100 | 192.168.1.200 | 8888 | 443 | UDP | 2345295732894 |
| | PACKET 3124 | 192.168.1.150 | 192.168.1.100 | 443 | 8889 | UDP | 345782945783 |
| FIRST ENVIRONMENT DATA 3230 | | | | | | | |
| FIRST FUNCTION TYPE NUMBER INFORMATION 3030 | | | | | | | |
| HMI:2 (192.168.1.100, 192.168.1.150) PLC:1 (192.168.1.200) | FIRST COMMUNICATION DATA 3130 | | | | | | |
| | | TRANSMISSION SOURCE ADDRESS | TRANSMISSION DESTINATION ADDRESS | TRANSMISSION SOURCE PORT | TRANSMISSION DESTINATION PORT | COMMUNICATION PROTOCOL | PAYLOAD |
| | PACKET 3131 | 192.168.1.150 | 192.168.1.200 | 8888 | 443 | TCP | 7384725745932870 |
| | PACKET 3132 | 192.168.1.200 | 192.168.1.150 | 443 | 8889 | TCP | 3452345793253 |
| | PACKET 3133 | 192.168.1.100 | 192.168.1.200 | 8888 | 443 | UDP | 2345295732894 |
| | PACKET 3134 | 192.168.1.200 | 192.168.1.100 | 443 | 8889 | UDP | 345782945783 |
| FIRST ENVIRONMENT DATA 3240 | | | | | | | |
| FIRST FUNCTION TYPE NUMBER INFORMATION 3040 | | | | | | | |
| HMI:2 (192.168.2.50, 192.168.2.100) PLC:2 (192.168.2.150, 192.168.2.200) | FIRST COMMUNICATION DATA 3140 | | | | | | |
| | | TRANSMISSION SOURCE ADDRESS | TRANSMISSION DESTINATION ADDRESS | TRANSMISSION SOURCE PORT | TRANSMISSION DESTINATION PORT | COMMUNICATION PROTOCOL | PAYLOAD |
| | PACKET 3141 | 192.168.2.100 | 192.168.2.200 | 8888 | 443 | TCP | 7384725745932870 |
| | PACKET 3142 | 192.168.2.200 | 192.168.2.100 | 443 | 8889 | TCP | 3452345793253 |
| | PACKET 3143 | 192.168.2.50 | 192.168.2.150 | 8888 | 443 | UDP | 2345295732894 |
| | PACKET 3144 | 192.168.2.150 | 192.168.2.50 | 443 | 8889 | UDP | 345782945783 |

FIG. 6

| CLASSIFICATION CLASS | CLASSIFICATION RULE |
|---|---|
| A | TRANSMISSION DESTINATION FUNCTION TYPE IS PLC, TCP COMMUNICATION IS PERFORMED, AND NINTH BIT OF TCP PAYLOAD IS 1 |
| B | TRANSMISSION DESTINATION FUNCTION TYPE IS PLC, AND UDP COMMUNICATION IS PERFORMED |
| C | TRANSMISSION DESTINATION FUNCTION TYPE IS PLC, AND UDP COMMUNICATION IS PERFORMED |
| D | TRANSMISSION DESTINATION FUNCTION TYPE IS HMI, AND TCP COMMUNICATION IS PERFORMED |
| ... | ... |

FIG. 7

| FIRST COMMUNICATION DATA 3110 | | | | | | | |
|---|---|---|---|---|---|---|---|
| | TRANSMISSION SOURCE ADDRESS | TRANSMISSION DESTINATION ADDRESS | TRANSMISSION SOURCE PORT | TRANSMISSION DESTINATION PORT | COMMUNICATION PROTOCOL | TCP PAYLOAD | CLASSIFICATION CLASS |
| PACKET 3115 | 192.168.0.100 | 192.168.0.200 | 8888 | 443 | TCP | 01101011101... | A |
| PACKET 3116 | 192.168.0.200 | 192.168.0.100 | 443 | 8889 | TCP | 01110110001... | D |
| PACKET 3117 | 192.168.0.100 | 192.168.0.200 | 8888 | 443 | TCP | 01010100000... | B |
| PACKET 3118 | 192.168.0.200 | 192.168.0.100 | 443 | 8889 | UDP | 10011011011... | ... |

FIG. 8

FIRST ENVIRONMENT 11

| CLASSIFICATION CLASS | THE NUMBER OF PACKETS /min |
|---|---|
| A | 250 |
| B | 311 |
| C | 87 |
| D | 480 |
| ... | ... |

FIG. 9

SECOND CONFIGURATION INFORMATION 2 0 1 0

| SECOND IDENTIFICATION INFORMATION (IP ADDRESS) | FUNCTION TYPE |
|---|---|
| 192.168.3.100 | HMI |
| 192.168.3.101 | HMI |
| 192.168.3.102 | HMI |
| 192.168.3.200 | PLC |
| 192.168.3.201 | PLC |
| 192.168.3.202 | PLC |

FIG. 10

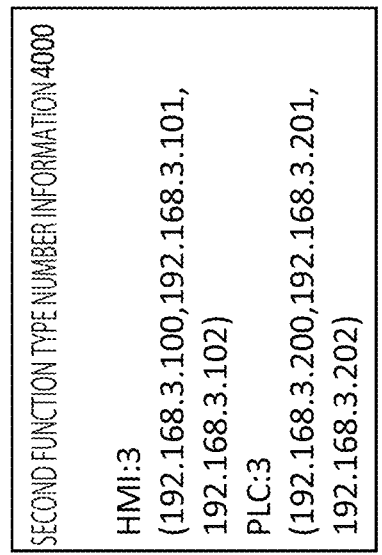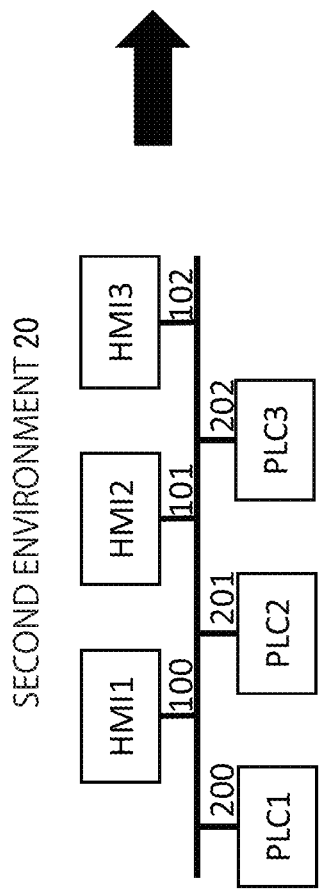
FIG. 11

PREDICTED PACKET NUMBER INFORMATION
OF SECOND ENVIRONMENT

| CLASSIFICATION CLASS | THE NUMBER OF PACKETS /min |
|---|---|
| A | 375 |
| B | 366 |
| C | 130 |
| D | 720 |
| ... | ... |

FIG. 13

IDENTIFICATION CORRESPONDENCE INFORMATION 4010

| FIRST IDENTIFICATION INFORMATION (IP ADDRESS) | SECOND IDENTIFICATION INFORMATION (IP ADDRESS) |
|---|---|
| 192.168.0.100 | 192.168.3.100 |
| 192.168.1.100 | 192.168.3.101 |
| 192.168.1.150 | 192.168.3.102 |
| 192.168.2.50 | 192.168.3.100 |
| 192.168.2.100 | 192.168.3.101 |
| 192.168.0.200 | 192.168.3.200 |
| 192.168.1.150 | 192.168.3.201 |
| 192.168.1.200 | 192.168.3.202 |
| 192.168.2.150 | 192.168.3.200 |
| 192.168.2.200 | 192.168.3.201 |

FIG. 14A

IDENTIFICATION CORRESPONDENCE INFORMATION 4011

| FIRST IDENTIFICATION INFORMATION (IP ADDRESS) | SECOND IDENTIFICATION INFORMATION (IP ADDRESS) |
|---|---|
| 192.168.0.100 | 192.168.3.100 |
| 192.168.0.100 | 192.168.3.101 |
| 192.168.0.100 | 192.168.3.102 |
| 192.168.0.200 | 192.168.3.200 |
| 192.168.0.200 | 192.168.3.201 |
| 192.168.0.200 | 192.168.3.202 |

COMMUNICATION PREDICTION DATA

| | TRANSMISSION SOURCE | TRANSMISSION DESTINATION | TRANSMISSION SOURCE PORT | TRANSMISSION DESTINATION PORT | COMMUNICATION PROTOCOL | PAYLOAD |
|---|---|---|---|---|---|---|
| PACKET 4001 | 192.168.3.100 | 192.168.3.200 | 8888 | 443 | TCP | 73847257459328744 |
| PACKET 4002 | 192.168.3.200 | 192.168.3.100 | 443 | 8889 | TCP | 345234579325344 |
| PACKET 4003 | 192.168.3.101 | 192.168.3.201 | 8888 | 443 | UDP | 23452957328945 |
| PACKET 4004 | 192.168.3.201 | 192.168.3.101 | 443 | 8889 | UDP | 345782945783 |
| PACKET 4005 | 192.168.3.102 | 192.168.3.202 | 8888 | 443 | TCP | 73847257459328744 |
| PACKET 4006 | 192.168.3.202 | 192.168.3.102 | 443 | 8889 | TCP | 345234579325344 |

FIG. 17

| | TRANSMISSION SOURCE | TRANSMISSION DESTINATION | TRANSMISSION SOURCE PORT | TRANSMISSION DESTINATION PORT | COMMUNICATION PROTOCOL | PAYLOAD |
|---|---|---|---|---|---|---|
| PACKET 4001 | 192.168.3.100 | 192.168.3.200 | 8888 | 443 | TCP | 7384725745932874 |
| PACKET 4002 | 192.168.3.200 | 192.168.3.100 | 443 | 8889 | TCP | 3452345793253 4 |
| PACKET 4003 | 192.168.3.101 | 192.168.3.201 | 8888 | 443 | UDP | 2345295732894 5 |
| PACKET 4007 | 192.168.3.101 | 192.168.3.201 | 8888 | 443 | UDP | 2345295732894 5 |
| PACKET 4004 | 192.168.3.201 | 192.168.3.101 | 443 | 8889 | UDP | 3457829457 83 |
| PACKET 4008 | 192.168.3.201 | 192.168.3.101 | 443 | 8889 | UDP | 3457829457 83 |
| PACKET 4005 | 192.168.3.102 | 192.168.3.202 | 8888 | 443 | TCP | 7384725745932874 |
| PACKET 4006 | 192.168.3.202 | 192.168.3.102 | 443 | 8889 | TCP | 3452345793253 4 |

(Packets 4007 and 4008 are marked as DUPLICATE)

INFORMATION PROCESSING APPARATUS, INFORMATION PROCESSING METHOD, AND NON-TRANSITORY COMPUTER READABLE MEDIUM

CROSS REFERENCE TO RELATED APPLICATIONS

This application is based upon and claims the benefit of priority from the prior Japanese Patent Application No. 2022-043201, filed on Mar. 17, 2022, the entire contents of which are incorporated herein by reference.

FIELD

Embodiments described herein relate to an information processing apparatus, an information processing method, and a non-transitory computer readable medium.

BACKGROUND

There is a method of learning a model (for example, a model for anomaly detection) with respect to a specific environment using communication data among a plurality of devices in the environment. However, in a case where there is data that is less frequently communicated, it takes time to collect data, which makes a learning period longer.

Further, there is a method of predicting a communication amount from information on devices in a target network and information on application installed in the devices on the basis of the number of devices in another network for which a communication amount such as the number of packets is known and information on application installed in the devices in the other network. In this method, it is assumed that in a case where the number of devices in the target network increases, an event in which communication between devices different from the increased devices does not occur. However, in a typical network, if the number of devices increases, a communication amount between devices different from the increased devices may increase, in which case, a communication amount of the target network cannot be predicted with high accuracy with the method.

BRIEF DESCRIPTION OF THE DRAWINGS

FIG. 4 is a view illustrating an example of first configuration information.

FIG. 6 is a view illustrating an example of the first environment data.

FIG. 7 is a view illustrating an example of classification rules.

FIG. 8 is a view illustrating an example of classified first communication data.

FIG. 9 is a view illustrating an example of the number of packets in the first environment in a fixed period for each classification.

FIG. 10 is a view illustrating an example of second configuration information.

FIG. 11 is a view for explaining an example of second function type number information.

FIG. 13 is a view illustrating an example of the number of packets predicted in a fixed period for each classification.

FIGS. 14A and 14B each is a view illustrating an example of identification correspondence information.

FIG. 15 is a view illustrating an example of communication prediction data.

FIG. 17 is a view illustrating an example of adjusted communication.

DETAILED DESCRIPTION

According to one embodiment, an information processing apparatus includes a communication amount predictor. The communication amount predictor acquires relation data in which a variation of a communication amount in a first environment including first devices of a plurality of function types is associated with a varied number of the first devices for each of the plurality of function types in a case where a number of first devices for each of the plurality of function types varies in the first environment. The communication amount predictor predicts a communication amount in a second environment including second devices of the plurality of function types on a basis of the relation data and a number of the second devices for each of the plurality of function types in the second environment.

Embodiments of the present invention will be described below with reference to the drawings.

First Embodiment

Figure 1:
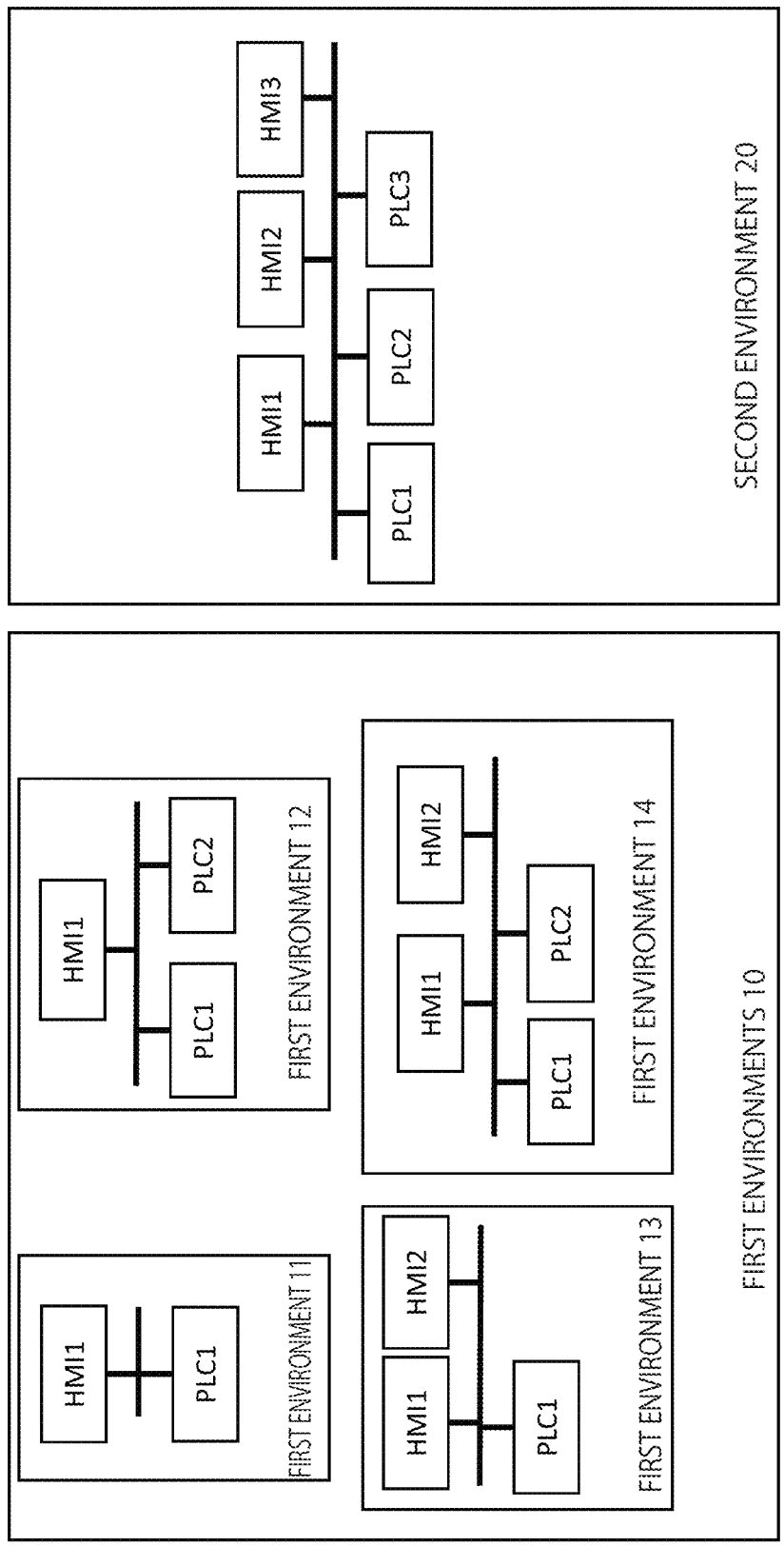
FIG. 1 is a schematic view illustrating an example of first environments and a second environment.

FIG. 1 is a view illustrating an example of first environments and a second environment as environments to be dealt with in the present embodiment. The first environments 10 are test environments constituted on the basis of combinations of various kinds of devices. The first environments 10 include a first environment 11, a first environment 12, a first environment 13 and a first environment 14. The second environment 20 is a production environment in which a communication amount is to be evaluated and is an environment different from the first environments. The second environment 20 is any communication network such as, for example, a network of a control system.

The first environments 11 to 14 and the second environment 20 include various kinds of devices. In each of the first environments 11 to 14 and the second environment, a plurality of devices connected via a network are provided, and data is communicated among the devices. The respective devices can be classified by classification of the devices or function types representing roles. While examples of the function types can include, for example, a programmable logic controller (PLC), a human machine interface (HMI), an intrusion detection system (IDS), and the like, the function types are not limited to these.

For example, a plurality of devices classified into the same classification or having the same role may be dealt with as different function types in a case where the devices utilize different communication protocols. Further, PLCs that adjust different items such as a PLC that adjusts a temperature and a PLC that adjusts an amount of water may be dealt with as the same function type or may be dealt with as different function types. In the following description, there is a case where a device is referred to as a function type provided at the device. For example, there is a case where a device whose function type is a PLC is simply referred to as a "PLC".

The devices in the first environments 11 to 14 will be referred to as first devices, and the devices in the second environment 20 will be referred to as second devices. For example, the first environment 12 in FIG. 1 includes one first device HMI1, and two first devices PLC1 and PLC2. The first environments of n-th power of 2 ($2^n$) are prepared in accordance with the number n of function types in the second environment as an example. In each first environment, there are one or two first devices having the same function type. In other words, there are two first devices at most having the same function type in each environment. In the example in FIG. 1, the second environment 20 includes two function types of a PLC and an HMI, and thus, in the first environments 10, there are four environments each including one or two devices having a function type of an HMI and one or two devices having a function type of a PLC. Specifically, the first environments 10 include the first environment 11 including one HMI and one PLC, the first environment 12 including one HMI and two PLCs, the first environment 13 including two HMIs and one PLC, and the first environment 14 including two HMIs and two PLCs. Note that the number of first environments is not limited to n-th power of 2. For example, the number of first environments may be larger than n-th power of 2.

Figure 2:
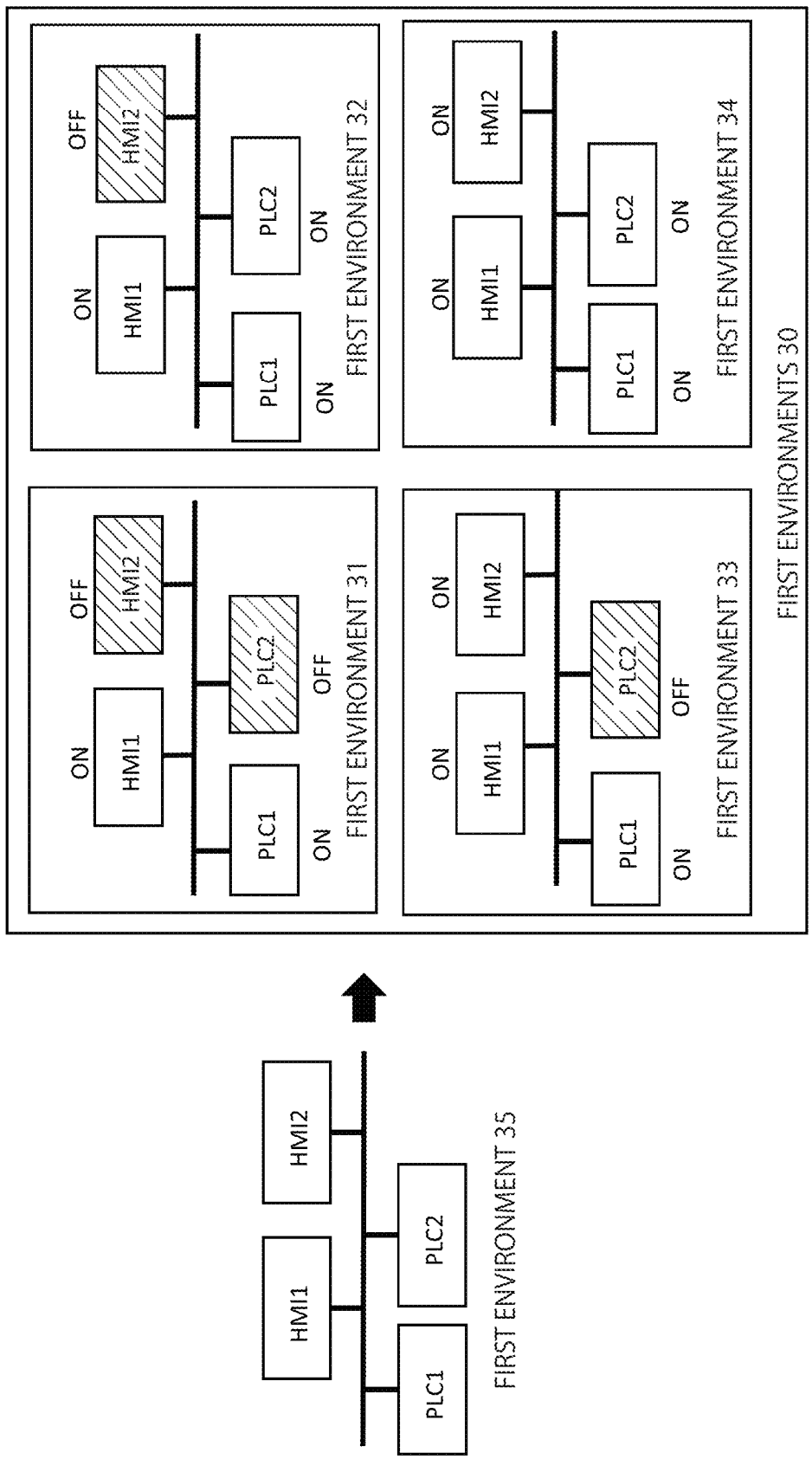
FIG. 2 is a schematic view illustrating another example of the first environments and the second environment.

FIG. 2 is a view illustrating another example of the first environments. If the number of the function types in the second environment 20 increases, the number of first environments to be prepared increases in an exponential manner. Thus, there is a case where it is difficult to separately prepare the first environments. To address this, for example, in a case where the number of function types in the second environment 20 is two, as illustrated in FIG. 2, one first environment 35 including two HMIs and two PLCs is prepared. An ON/OFF state of a power supply of each first device in the first environment 35 is changed. By this means, even if only one first environment 35 is actually prepared, first environments 31 to 34 having property equivalent to the property of the first environments 11 to 14 can be easily implemented.

However, the first environments to be actually prepared are not limited to one first environment 35, and two or three first environments may be prepared. Also in this case, by changing an ON/OFF state of a power supply of the first devices in at least one environment, four environments having property equivalent to the property of the first environments 11 to 14 can be implemented.

While in the above description of FIG. 1, it is only necessary that two first devices at most having the same function type be provided in a certain first environment, three or more first devices having the same function type may be provided. In this case, it is possible to increase prediction accuracy of a communication amount in the second environment in the present embodiment.

Figure 3:
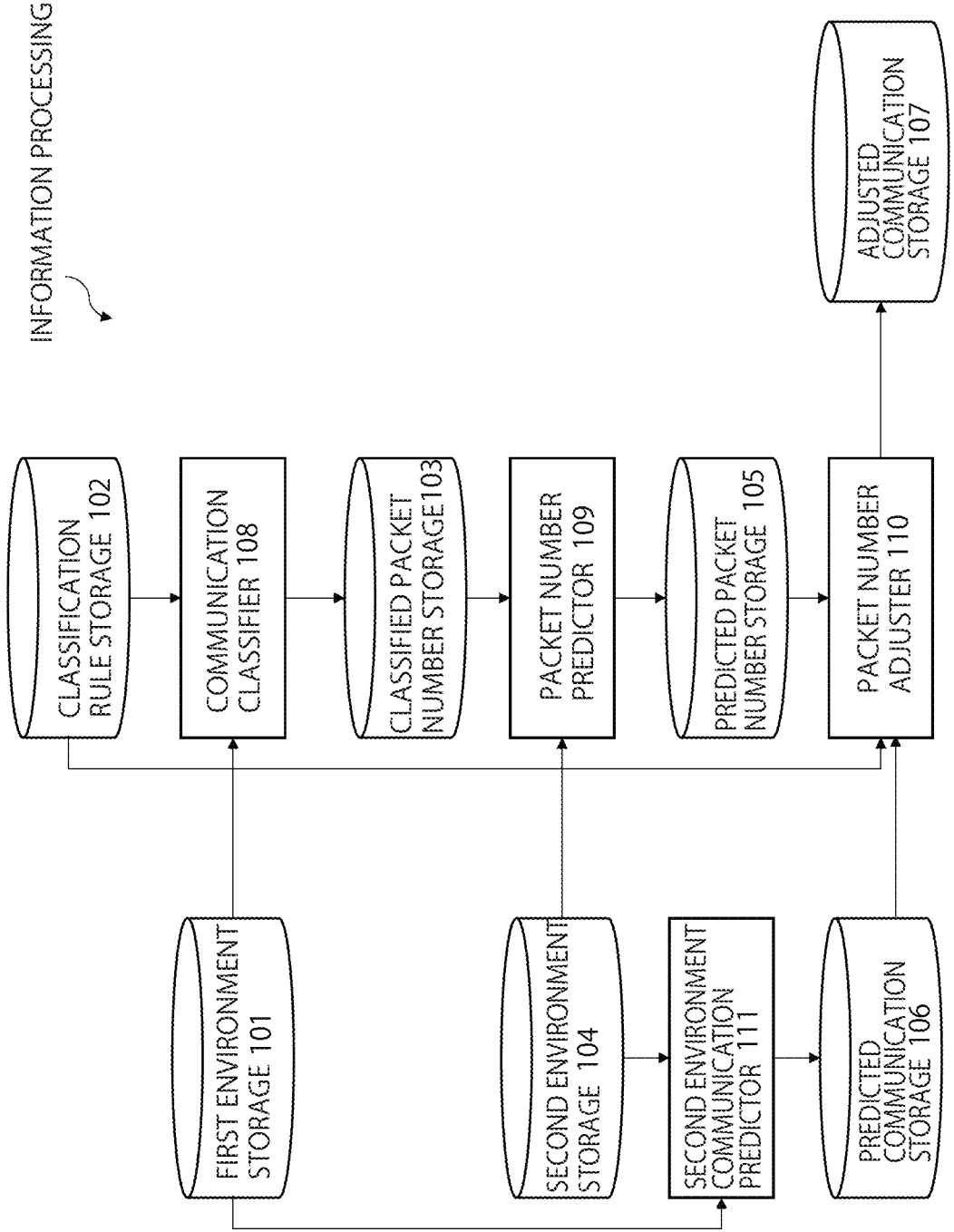
FIG. 3 is a block diagram of an information processing apparatus according to a first embodiment.

FIG. 3 is a block diagram of an information processing apparatus 100 according to the first embodiment. The information processing apparatus 100 predicts the number of packets (communication amount) to be communicated in the second environment on the basis of communication data collected from the first environments 10. Further, the information processing apparatus 100 predicts communication data including packets to be communicated among the second devices in the second environment 20. Then, the information processing apparatus 100 adjusts the number of packets in the predicted communication data of the second environment on the basis of the predicted number of packets. This can achieve prediction of communication content and a communication amount (the number of packets) with high accuracy no matter how many second devices are in the second environment 20. The predicted communication content and communication amount can be used in, for example, learning of a model that detects an anomaly (for example, a cyber attack) in the second environment. The information processing apparatus 100 will be described in detail below.

The information processing apparatus 100 includes a first environment storage 101, a classification rule storage 102, a classified packet number storage 103, a second environment storage 104, a predicted packet number storage 105, a predicted communication storage 106, an adjusted communication storage 107, a communication classifier 108, a packet number predictor 109 (communication amount predictor), a packet number adjuster 110 (communication amount adjuster), and a second environment communication predictor 111 (communication predictor). Each storage is constituted with a storage medium such as, for example, a random access memory (RAM), a flash memory and an optical disk. The blocks 108, 109, 110 and 111 can be constituted with, for example, a processor such as a CPU, an MPU and an ASIC or a circuit.

The first environment storage 101 stores configuration information (first configuration information) of first devices in each first environment in the first environments 10 and environment data (first environment data) of each first environment.

The first configuration information is information indicating a correspondence relationship between identification information (first identification information) of the first devices in the first environments and function types. The first identification information is provided in advance to each of a plurality of first devices.

The first identification information is information that can uniquely identify a certain first device. As the first identification information, for example, information that can identify a transmission destination or a transmission source to be used as an address when communication is performed between the first devices in the first environment can be used. While the address to be used as the first identification information during communication is, for example, an internet protocol (IP) address, a media access control (MAC) address, or the like, the address is not limited to these.

Alternatively, as the first identification information, information that can change in accordance with an environment to which a certain first device belongs may be used. For example, as the first identification information, port number (port), a virtual local area network identity document (VLAN ID), or the like, may be used.

FIG. 4 is a view illustrating an example of the first configuration information in the first environments 11 to 14.

The first configuration information 1010 indicates correspondence between the first identification information (IP addresses) of the first devices in the first environments 11 to 14 and function types. While in the example in FIG. 4, addresses of devices in the first environments 12 and 13 partially overlap with each other, all the addresses of the devices may be different among a plurality of first environments.

Each piece of the first environment data includes first function type number information of the first environment, and communication data (first communication data) acquired from the first environment. The communication data is information data including one or a plurality of packets. The communication data in the first environment data may be data measured in an actual network or may be data created on the basis of specifications upon design.

The first function type number information includes the number of configurations of the first devices for each function type of the first environment. Further, the first function type number information may include the above-described first configuration information (first identification information corresponding to a function type of each first device). In a case where each first environment is implemented using the method illustrated in FIG. 2 above, the first function type number information may include the number of first devices in an ON state for each function type of the first environment.

Figure 5:
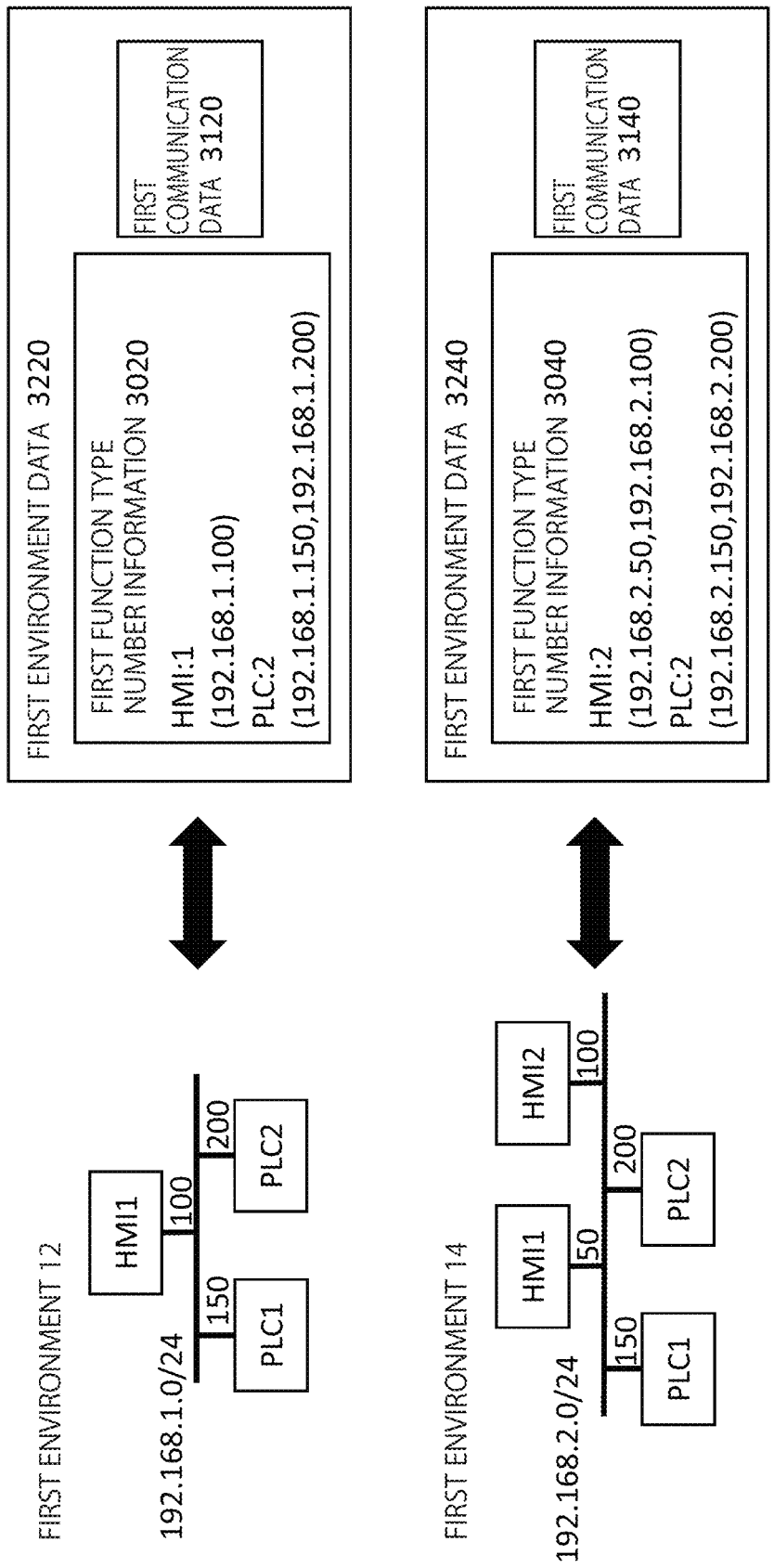
FIG. 5 is a view for explaining correspondence between the first environments and first environment data.

FIG. 5 is a view illustrating an example of the first environment data corresponding to each first environment. For example, first environment data 3220 including first function type number information 3020 and first communication data 3120 corresponds to the first environment 12.

The first function type number information 3020 of the first environment 12 can be expressed as

HMI:1
(192.168.1.100)
PLC:2
(192.168.1.150, 192.168.1.200).

This means that first devices provided in the first environment 12 are one HMI and two PLCs, and first identification information of the one HMI is 192.168.1.100, and first identification information of the two PLCs is 192.168.1.150 and 192.168.1.200. In this example, the first function type number information 3020 also includes content (see FIG. 4) of the first configuration information of the first environment 12.

FIG. 6 illustrates a specific example of the first environment data of each first environment stored in the first environment storage 101. As described above, the communication data is information data including one or a plurality of packets. In the present embodiment, the packet includes a transmission source address, a transmission destination address, a transmission source port, a transmission destination port, a type of a communication protocol, and a TCP payload. The packet may include other information. For example, the packet may include transmission time. The packet is a typical name of a data transmission unit and can include transmission units called in various ways such as a frame and a segment. As an example, a packet 3111 that is one of packets included in the first communication data 3110 includes a transmission source address: 192.168.0.100, a transmission destination address: 192.168.0.200, a transmission source port: 8888, a transmission destination port: 443, a communication protocol: TCP, and a payload: 7384725745932874.

In the present embodiment, the transmission source address is an IP address of a first device that is a data transmission source. The transmission destination address is an IP address of the first device that is a data transmission destination. The transmission source port is a port number to be used in a protocol of a transport layer of the first device that is the data transmission source. The transmission destination port is a port number to be used in a protocol of a transport layer of the first device that is the data transmission destination. In other words, the transmission source address and the transmission source port, and the transmission destination address and the transmission destination port are one example of the first identification information. Examples of the protocol of the transport layer can include TCP, UDP, and the like.

The classification rule storage 102 stores classification rules of packets. The classification rules are standards for determining a classification class to which a packet belongs on the basis of information on the packet.

FIG. 7 is a view illustrating an example of the classification rules. The classification rules are rules for classifying a packet into one of a plurality of classification classes. As the classification rules, as an example, at least one of a function type, a communication protocol or information on a payload is used. The classification rules may be arbitrarily created by a user who is an operator of the information processing apparatus 100 or may be created through machine learning, or the like, on the basis of the first communication data obtained from the first environments. FIG. 7 illustrates examples of a plurality of classification rules created using function types of transmission destinations, communication protocols, and information on payloads. A plurality of classification rules are rules for classifying a packet into one of classification classes A, B, C, D, . . . Note that in the classification rules, identification information of the devices is not distinguished.

The communication classifier 108 classifies a plurality of packets included in the first communication data for each first environment on the basis of the plurality of classification rules stored in the classification rule storage 102. The communication classifier 108 calculates the number of packets to be communicated per fixed period for each classification class. The fixed period can be arbitrarily set at 10 seconds, one minute, one hour, or the like. In a case where a period required for acquiring communication packets that are to be acquired in each first environment is longer than the fixed period, the number of packets to be communicated per fixed period may be an average number of packets per fixed period.

FIG. 8 illustrates an example of results obtained by classifying some packets (different from the packets illustrated in FIG. 6) in the first communication data 3110 in any first environment. The classification rules used in this event are the classification rules illustrated in FIG. 7. For example, the packet 3115 is classified into the classification class A because the function type of the transmission destination is a PLC, the communication protocol is TCP, and a value of the ninth bit from the beginning of the TCP payload is 1. The packet 3117 is classified into the classification class B because the function type of the transmission destination is a PLC, the communication protocol is TCP, and a value of the ninth bit from the beginning of the TCP payload is 0. Further, the packet 3116 is classified into the classification class D because the function type of the transmission destination is an HMI, and the communication protocol is TCP. The communication classifier 108 thus classifies a plurality of packets included in the communication data for each first environment and counts the number of packets of each classification class. Note that while in FIG. 6, the payload is expressed as a decimal, in FIG. 8, the payload is expressed as a binary number.

The classified packet number storage 103 stores a pair of the first function type number information of each first environment and the number of packets in a fixed period for each classification class in each first environment. The number of packets for each classification in a fixed period will be referred to as the number of classified packets, and information indicating the number of classified packets will be referred to as classified packet number information.

FIG. 9 is a view illustrating an example of the classified packet number information for the first environment 11. Information on the number of packets communicated per one minute is indicated for each of the classification classes A, B, C, D, . . . Such classified packet number information is stored in the classified packet number storage 103 also for the first environments 12 to 14.

The second environment storage 104 stores the second function type number information and the second configuration information for the second environment 20.

The second function type number information includes the number of devices for each function type of the second devices in the second environment.

The second configuration information is information indicating a correspondence relationship between identification information (second identification information) and function types of the second devices. The second identification information is provided in advance to each of a plurality of second devices.

The second identification information is information that can uniquely identify a certain second device. As the second identification information, for example, information that can identify a transmission destination or a transmission source to be used as an address when communication is performed between the second devices in the second environment. While the address to be used as the second identification during communication is, for example, an IP address, a MAC address, or the like, the address is not limited to these.

Alternatively, information that can change in accordance with an environment to which a certain second device belongs may be used as the second identification information. For example, a port number, a VLAN ID, or the like, may be used as the second identification information.

FIG. 10 is a view illustrating an example of the second configuration information 2010. The second configuration information 2010 indicates correspondence between the second identification information (IP address) and function types of the second devices in the second environment.

FIG. 11 illustrates a view of second function type number information 4000 for the second environment 20. The second function type number information 4000 includes the number of configurations of the second devices for each function type of the second environment. While in the example in FIG. 10, the second function type number information includes content of the second configuration information (second identification information corresponding to the function type of each second device), content of the second configuration information does not have to be included in the second function type number information.

The packet number predictor 109 acquires the first function type number information of each first environment and the classified packet number information of each first environment from the classified packet number storage 103 and acquires the second configuration information 2010 and the second function type number information from the second environment storage 104. The packet number predictor 109 predicts the number of packets of each classification class communicated in the second environment using these acquired information and calculation through machine learning and the like. Information (predicted packet number information) indicating the number of packets predicted in each classification class is stored in the predicted packet number storage 105. The packet number predictor 109 corresponds to a communication amount predictor that predicts a communication amount in the second environment.

Here, an example of calculation to be executed by the packet number predictor 109 will be described using the drawings and formulas. The number of packets per fixed period of a target classification class in the first environment or an average of a ratio (or a ratio of an average) of the number of packets per fixed period of a target classification class among a plurality of classification classes is set at $\overline{P}(C_1, \ldots, C_n)$. While a case will be assumed in the following description where $\overline{P}(C_1, \ldots, C_n)$ is the number of packets per fixed period of the target classification class, in a case of an average of a ratio (or a ratio of an average) of the number of packets per fixed period of the classification class, it is only necessary to read the number of packets as the average of the ratio (or the ratio of the average) as appropriate.

$C_1, \ldots, C_n$ represent the numbers of devices of function type Fi (i=1, . . . , n) in the first environment. Further, the number of packets communicated in an environment where the numbers of devices of each function type is $C_1, \ldots, C_n$ is represented as $\overline{P}(C_1, \ldots, C_n)$. It is assumed in the present embodiment that the function type F1 (that is, i=1) is an HMI, and the function type F2 (that is, i=2) is a PLC.

In this event, in the first environment, a difference $\Delta \overline{P}_1(C_1, \ldots, \check{C}_1, \ldots, C_n)$ defined in the following formula 1 is calculated for all i's (1≤ i≤n) representing the function types. Here, ˇ indicates that a variable with ˇ does not exist. For example, $\Delta \overline{P}_2(C_1, \overline{C}_2, C_3)$ represents $\Delta \overline{P}_2(C_1, C_3)$.

[Math. 1]

$$\Delta \overline{P}_i(C_1, \ldots, \check{C}_i, \ldots, C_n) := \overline{P}(C_1, \ldots, C_{i-1}, 2, C_{i+1}, \ldots, C_n) - \overline{P}(C_1, \ldots, C_{i-1}, 1, C_{i+1}, \ldots, C_n) \quad (1)$$

The formula 1 represents an increase of the number of packets in a case where the number of $F_i$ (the number of devices of the function type i) increases by 1 in any first environment.

For example, by calculating a difference between the number of packets $\overline{P}(1,2)$ in the first environment 12 in FIG. 1 and the number of packets $\overline{P}(1,1)$ in the first environment 11 in FIG. 1, $\Delta \overline{P}_2(1)$, that is, an increase of the number of packets (or an increase of an average of a ratio) in a case where the number of PLCs increases by one in the first environment can be obtained. The number of packets is calculated from the number of packets included in communication data in each of the first environment 11 and the first environment 12. $\Delta \overline{P}_2(2)$ may be calculated from a difference between the number of packets $\overline{P}(2,2)$ in the first environment 14 in FIG. 1 and the number of packets $\overline{P}(2,1)$ in the first environment 13 in FIG. 1. While the increase of the number of packets in a case where the number of devices of the function type F2 increases by one is not necessarily the same between in a case where one device of the function type F1 exists in the first environment 11 and in a case where two devices of the function type F1 exist, by calculating the number of packets using at least one method, it is possible to simply estimate the increase of the number of packets including change in the number of packets between devices other than the increased device while preventing increase in the number of first environments. If there is a first environment including three or more devices of the function type F1, the number of packets in a case where the number of devices of the function type F2 increases by one may be calculated in a similar manner for the first environment. This can improve prediction accuracy of a communication amount of the second environment.

In a similar manner, by calculating a difference between the number of packets $\overline{P}(2,1)$ in the first environment 13 in FIG. 1 and the number of packets $\overline{P}(1,1)$ in the first environment 11 in FIG. 1, $\Delta\overline{P}_1(1)$, that is, an increase (or an increase of an average of a ratio) of the number of packets in a case where the number of HMIs increases by one in the first environment can be obtained. $\Delta\overline{P}_1(2)$ can be calculated from a difference between the number of packets $\overline{P}(2,2)$ in the first environment 14 in FIG. 1 and the number of packets $\overline{P}(1,2)$ in the first environment 12 in FIG. 1.

The above formula 1 corresponds to relation data in which a variation of the communication amount in the first environment including first devices of a plurality of function types is associated with the varied number of the first devices for each of the plurality of function types in a case where the number of first devices for each function type varies in the first environment. The relation data may be prepared for each classification class.

Then, differences $(d_1, \ldots, d_n)$ in the numbers of devices of each function type is obtained between the number of packets per fixed period of the target classification class (or an average of a ratio of the number of packets per fixed period of the classification class or a ratio of an average) $\overline{P}(1, \ldots, 1)$ in the first environment in a case where the number of devices of each function type is all 1, and the number of packets per fixed period of the target classification class (or an average of a ratio of the number of packets per fixed period of the classification class or a ratio of an average) $\overline{P}(C_1^r, \ldots, C_n^r)$ in the second environment 20 in which the number of devices of each function type Fi is $C_i^r$ using the following formula 2. $C_1^r, \ldots, C_n^r$ represent the numbers of devices of function type Fi (i=1, \ldots, n) in the second environment.

[Math. 2]

$$(d_1, \ldots, d_n) := (c_1^r, \ldots, c_n^r) - (1, \ldots, 1) = (C_1^r - 1, \ldots, C_n^r - 1) \quad (2)$$

By adding the difference obtained from formula 1 to $\overline{P}(1, \ldots, 1)$ (the number of elements in brackets indicates the number n of devices of each function type) $d_i$ times for each function type, the number of packets, and the like, of the target classification class in the second environment are estimated. The processing is indicated in the following formula 3. The formula 3 indicates midstream of the calculation. By assigning i=1, \ldots, n to i in formula 3, formula 3 is recursively calculated from i=1 to i=n.

[Math. 3]

$$\overline{P}(C_1^r, \ldots, C_i^r, 1, \ldots, 1) = \Delta\overline{P}_i(C_1, \ldots, C_{i-1}, 1, \ldots, 1)d_i + \overline{P}(C_1^r, \ldots, C_{i-1}^r, 1, \ldots, 1)$$

In other words, formula 3 is sequentially calculated from i=1 as in the following formula 4. As a result of the calculation, the number of packets, and the like, $\overline{P}(C_1^r, \ldots, C_n^r)$ per fixed period of the target classification class in the second environment 20 can be obtained.

[Math. 4]

$$\overline{P}(C_1^r, 1, \ldots, 1) = \Delta\overline{P}_1(1, \ldots, 1)d_1 + \overline{P}(1, \ldots, 1)$$
$$\overline{P}(C_1^r, C_2^r, 1, \ldots, 1) = \Delta\overline{P}_2(C_1, 1, \ldots, 1)d_2 + P(C_1^r, 1, \ldots, 1) \quad (4)$$

\ldots (skip the rest)

By performing the processing from formula 1 to formula 4 while selecting each of all the classification classes as a classification class for which evaluation is to be performed, the number of packets, and the like, per fixed period are calculated for each classification class.

The packet number predictor predicts the number of packets (communication amount) in the second environment on the basis of formula 1 (relation data) and the number of the second devices for each function type in the second environment including the second devices of the plurality of function types in this manner.

Figure 12:
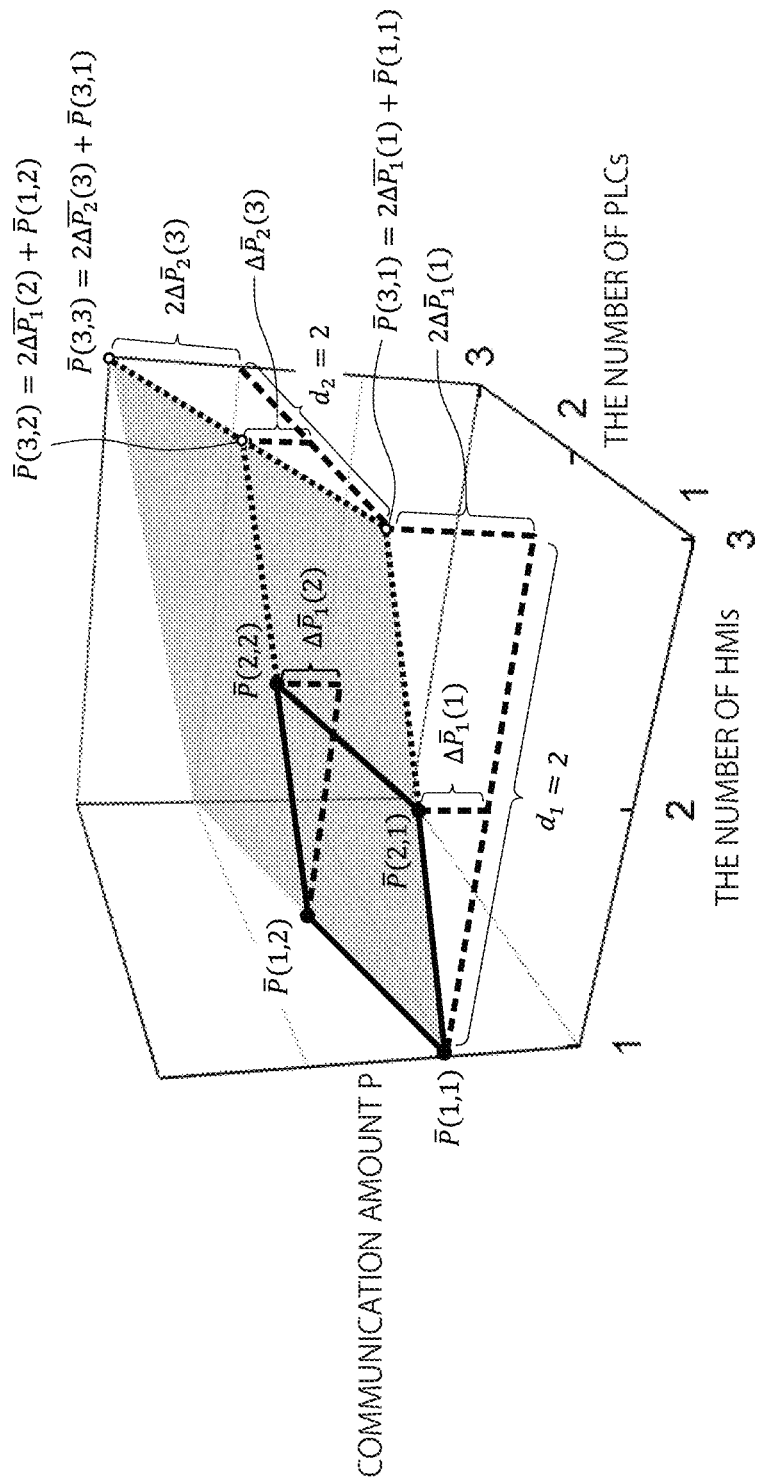
FIG. 12 is a view for schematically explaining processing of a packet number predictor.

FIG. 12 is a view schematically exemplifying the above description. FIG. 12 indicates the number of function types on a horizontal axis and indicates the number of packets on a vertical axis. Each point indicated by • represents the number of packets (or an average of a ratio of the number of packets) in the first environment. Specifically, $\overline{P}(1,1)$ is the number of packets in the first environment 11, and $\overline{P}(2,1)$ is the number of packets in the first environment 13 (see FIG. 1). The second environment includes three HMIs and three PLCs (that is, $C_1^r=3$, $C_2^r=3$). Here, procedure for obtaining the number of packets $\overline{P}(3,3)$ in the second environment in any classification class will be described using formula 1 to formula 3 with reference to FIG. 12.

First, all differences $\Delta\overline{P}_1$ are obtained from any two points in the first environments 10 using formula 1. In a case of FIG. 12, $\Delta\overline{P}_1(1)$ is obtained from $\overline{P}(1,1)$ and $\overline{P}(2,1)$. In a similar manner, $\Delta\overline{P}_1(2)$ is obtained from $\overline{P}(1,1)$ and $\overline{P}(2,2)$.

Then, $(d_1, d_2) = (C_1^r, C_2^r) - (1,1) = (2,2)$ is obtained using formula 2.

Then, $\overline{P}(3,2)$ is obtained from formula 3 by adding $\Delta\overline{P}_1(2)$ to $\overline{P}(1,2)$ twice.

Then, $\overline{P}(3,1)$ is obtained from formula 3 by adding $\Delta\overline{P}_1(1)$ to $\overline{P}(1,1)$ twice. In a similar manner, $\overline{P}(3,2)$ is obtained by adding $\Delta\overline{P}_1(2)$ to $\overline{P}(1,2)$ twice.

Then, $\Delta\overline{P}_2(3)$ is obtained from $\overline{P}(3,2)$ and $\overline{P}(3,1)$ on the basis of formula 1.

Finally, $\overline{P}(3,3)$ is obtained from formula 3 by adding $\Delta\overline{P}_2(3)$ to $\overline{P}(3,1)$ twice.

An increase $\Delta\overline{P}_2(3)$ of the number of packets in a case where the number of devices of the function type F2 increases by one is added twice assuming that there are two devices of the function type F1 although there are three devices of the function type F1. If there are three devices of the function type F1 and two first environments having different configurations, it is only necessary to add $\Delta\overline{P}_2(3)$ obtained for the two first environments twice. This can achieve estimation of the number of packets with higher accuracy.

The predicted packet number storage 105 stores the predicted packet number information for each classification class in the second environment 20. The predicted packet number information indicates the predicted number of packets in a fixed period of the classification class.

FIG. 13 is a view illustrating an example of the predicted packet number information. For example, in the classification class A, the number of packets per one minute is 375.

The second environment communication predictor 111 predicts data of communication performed in the second environment. In more detail, the second environment communication predictor 111 predicts data (content of packets) to be communicated among the second devices in the second environment. Processing to be performed by the second environment communication predictor 111 will be described in detail below.

The second environment communication predictor 111 creates correspondence information of the identification information (identification correspondence information) between the first devices and the second devices on the basis of at least one of configuration information (first configuration information) of each first environment in the first environment storage 101 and configuration information (second configuration information) of the second environment 20 in the second environment storage 104.

FIG. 14A is a view illustrating an example of the identification correspondence information. Identification correspondence information 4010 is information in which the identification information of the first devices in the first configuration information 1010 (FIG. 4) in the first environment 11 to the first environment 14 and the identification information of the second devices in the second configuration information 2010 (FIG. 11) corresponding to the same function type are associated with each other. For example, the first identification information 192.168.0.100 corresponding to the function type of the PLC is stored in the first configuration information 1010, and the second identification information 192.168.3.100 corresponding to the function type of the PLC is stored in the second configuration information 2010. In this case, as illustrated in FIG. 14A, the first identification information 192.168.0.100 and the second identification information 192.168.3.100 are stored in the identification correspondence information 4010 in association with each other. A plurality of different pieces of first identification information may be associated with the same second identification information.

While in the example in FIG. 14A, the first configuration information of all of the first environment 11 to the first environment 14 is used, first configuration information of one, two or three first environments selected from the first environment 11 to the first environment 14 may be used.

FIG. 14B illustrates an example of identification correspondence information 4011 created on the basis of the first configuration information of one first environment (first environment 11) and the second configuration information 2010. Only one first device exists for each of two function types in the first environment 11, and three second devices exist for each of two function types in the second environment. Thus, the first device having the same identification information (IP address) is associated with three second devices having the same function type and having different identification information (IP addresses).

Also in a case where the first configuration information of two or three first environments among the first environment 11 to the first environment 14 is used, the identification correspondence information can be created in a similar manner to the example in FIG. 14A or FIG. 14B.

Then, the second environment communication predictor 111 creates communication prediction data by substituting the second identification information for the first identification information included in the first communication data of the first environment used in creation of the identification correspondence information on the basis of the created identification correspondence information.

FIG. 15 is a view illustrating an example of the communication prediction data. As can be clear from comparison with FIG. 6, the second identification information (IP addresses of the second devices) is substituted for the first identification information (IP addresses of the first devices) on the basis of the identification correspondence information.

Note that there can be a case where the first communication data includes the first identification information for which the second identification information is not substituted. In this case, the communication prediction data generated from the first communication data is deleted.

Figure 16:
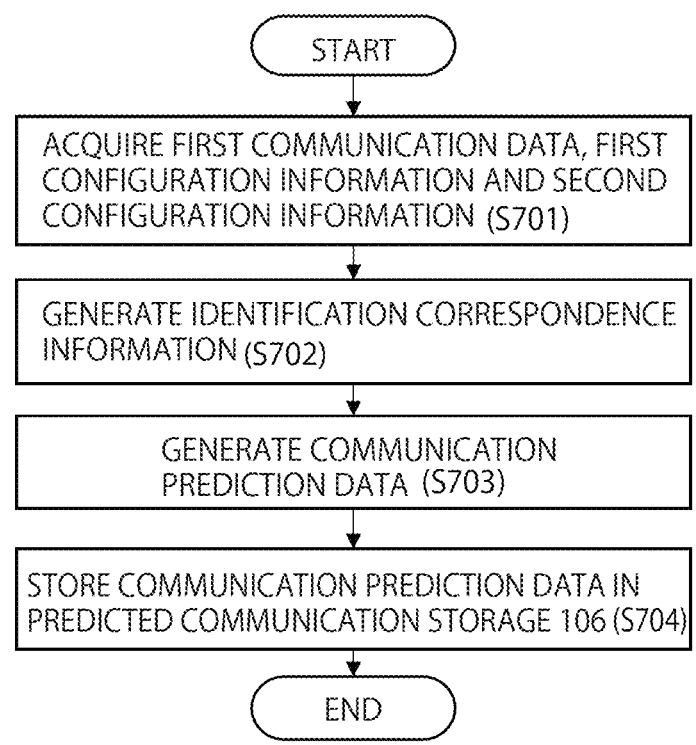
FIG. 16 is a flowchart of an example of operation of the information processing apparatus according to the first embodiment.

FIG. 16 is a flowchart illustrating an example of second environment prediction processing to be executed by the second environment communication predictor 111.

First, the second environment communication predictor 111 acquires the first communication data and the first configuration information of at least one first environment from the first environment storage 101 and acquires the second configuration information from the second environment storage 104 (step S701).

Then, the second environment communication predictor 111 generates identification correspondence information in which the first identification information and the second identification information corresponding to the same function type are associated with each other on the basis of the acquired first configuration information and second configuration information (step S702).

Then, the second environment communication predictor 111 generates communication prediction data in which the second identification information is substituted for the first identification information of each packet included in the acquired first communication data on the basis of the identification correspondence information (step S703).

Finally, the second environment communication predictor 111 stores the created communication prediction data in the predicted communication storage 106 (step S704).

Further, the second environment communication predictor 111 may predict data (packets) to be communicated among the second devices in the second environment using other techniques. For example, the second environment communication predictor 111 may predict data (packets) to be communicated among the second devices in the second environment using past communication history.

The packet number adjuster 110 acquires the communication prediction data from the predicted communication storage 106 and classifies each packet included in the communication prediction data into one of a plurality of classification classes in accordance with the classification rules. Then, the packet number adjuster 110 acquires the predicted packet number information from the predicted packet number storage 105 and adjusts the number of packets of each classification class included in the communication prediction data using at least one of discarding or duplication so as to achieve the number of packets in the predicted packet number information for each classification class. In this event, packets to be duplicated or packets to be discarded may be randomly selected, or packets to be selected may be determined so that a communication source (transmission source), a communication destination (transmission destination) and communication content are not largely biased.

FIG. 17 is a view illustrating an example where the packet number adjuster 110 adjusts the number of packets for a certain classification class. In a case of FIG. 17, a packet 4007 is duplicated from a packet 4003, and a packet 4008 is duplicated from a packet 4004. The number of packets is adjusted in accordance with the number of packets in the predicted packet number information through duplication, discarding, or the like, in a similar manner for other classification classes. In a case where the predicted packet number information indicates an average of a ratio of packets for each classification class, the number of packets only requires to be adjusted for each classification class so as to match the ratio.

The adjusted communication storage 107 stores the communication data (adjusted communication data) for which the number of packets has been adjusted by the packet number adjuster 110.

An operation example of the information processing apparatus 100 in FIG. 3 will be described using FIG. 18.

Figure 18:
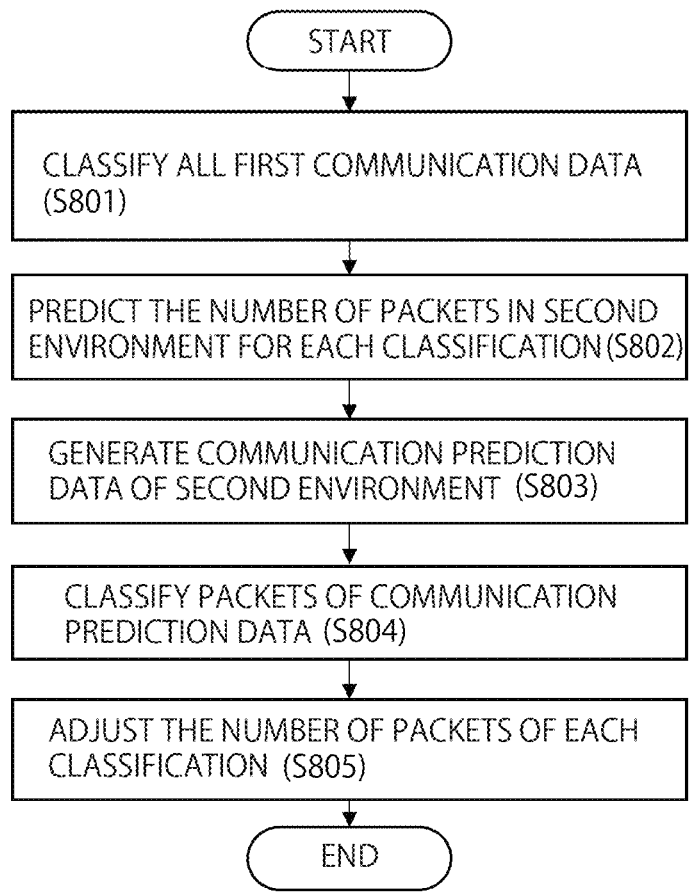
FIG. 18 is a flowchart of an example of operation of the information processing apparatus according to the first embodiment.

FIG. 18 is a flowchart of an example of processing to be executed by the information processing apparatus 100.

In step S801, the communication classifier 108 classifies all packets included in the first communication data into one of a plurality of classification classes for each first environment in accordance with the classification rules. The communication classifier 108 calculates the number of packets in a fixed period for each classification class for each first environment.

In step S802, the packet number predictor 109 predicts the number of packets (or an average of a ratio of the number of packets for each classification class) in a fixed period of each classification class in the second environment on the basis of the first function type number information and the first configuration information of each first environment, the classified packet number information of each first environment and the second function type number information and the second configuration information of the second environment (step S802).

In step S803, the second environment communication predictor 111 creates information (identification correspondence information) in which the first configuration information of each first environment and the second configuration information of the second environment corresponding to the same function type are associated with each other. The second environment communication predictor 111 creates communication prediction data in which the second identification information is substituted for the first identification information of the packets included in the first communication data of at least one first environment on the basis of the created identification correspondence information.

In step S804, the packet number adjuster 110 classifies each packet included in the communication prediction data into one of a plurality of classification classes in accordance with the classification rules.

In step S805, the packet number adjuster 110 adjusts the number of packets of the communication prediction data classified into each classification class through duplication, discarding, or the like, of packets so as to match the number of packets (or the average of the ratio of the number of packets) for each classification class predicted in step S802. The processing ends as described above.

As described above, according to the first embodiment, the number of packets for each classification class in a production environment is predicted, communication data (packets) to be communicated in the production environment is predicted for each classification class, and the predicted number of packets for each classification class in the production environment is adjusted in accordance with the predicted number of packets. By this means, it is possible to estimate the number of packets (or the average of the ratio of the number of packets) to be communicated in the production environment with high accuracy for each classification class.

While in the present embodiment, the number of packets in the production environment is predicted for each classification class, the number of packets in the production environment may be predicted without the packets being classified. In this case, packets do not have to be classified also for the first environment.

Modifications

It is assumed that in a case where the second devices in the second environment 20 includes n function types $F_1, \ldots, F_n$, and the number of devices of each function type is $C_1, \ldots, C_n$, the number of packets (communication amount) P to be communicated in the second environment can be approximated as in the following formula 5.

[Math. 5]

$$P(C_1, \ldots, C_n) = \alpha_{1,\ldots,n}(C_1 \ldots C_n) + \alpha_{1,\ldots,n-1}$$
$$(C_1 \ldots C_{n-1}) + \alpha_{2,\ldots,n}(C_2 \ldots C_n) + \alpha_{3,\ldots,n,1}$$
$$(C_3 \ldots C_1) + \ldots + \alpha_{1,\ldots,n-2}(C_1 \ldots$$
$$C_{n-2}) + \alpha_{2,\ldots,n-1}(C_2 \ldots C_{n-1}) + \alpha_{3,\ldots,n-1,n}$$
$$(C_3 \ldots C_n) + \ldots$$

$$\ldots$$

$$+ \alpha_{1,2}C_1 C_2 + \alpha_{2,3}C_2 C_3 + \ldots + \alpha_{n-1,n}C_{n-1}C_n +$$
$$\alpha_{n,1}C_n C_1 + \alpha_1 C_1 + \alpha_2 C_2 + \ldots + \alpha_n C_n \quad (5)$$

For example, in a case where n=2, 3 and 4, the number of packets P respectively becomes as follows.

[Math. 6]

$$P(C_1, C_2) = \alpha_{1,2}C_1 C_2 + \alpha_1 C_1 + \alpha_2 C_2 \quad (6)$$

[Math. 7]

$$P(C_1, C_2, C_3) = \alpha_{1,2,3}C_1, C_2 C_3 + \alpha_{1,2}C_1 C_2 + \alpha_{2,3}C_2 C_3 +$$
$$\alpha_{3,1}C_3 C_1 + \alpha_1 C_1 + \alpha_2 C_2 + \alpha_3 C_3 \quad (7)$$

[Math. 8]

$$P(C_1, C_2, C_3, C_4) = \alpha_{1,2,3,4}C_1 C_2 C_3 C_4 + \alpha_{1,2,3}C_2, C_3, C_4 +$$
$$\alpha_{3,4,1}C_3 C_4 C_1 + \alpha_{4,1,2}C_4 C_1 C_2 \alpha_{1,2}C_1 C_2 +$$
$$\alpha_{2,3}C_2 C_3 + \alpha_{3,4}C_3 C_4 + \alpha_{4,1}C_4 C_1 + \alpha_{1,3}C_1 C_3 +$$
$$\alpha_{2,4}C_2 C_4 + \alpha_1 C_1 + \alpha_2 C_2 + \alpha_3 C_3 + \alpha_4 C_4 \quad (8)$$

Formula 5 indicates that in a case where the number $C_i$ of devices of the function type $F_i$ increases, the number of packets linearly (in accordance with a linear function) increases with a certain coefficient a.

Formula 5 corresponds to relation data in which a variation of a communication amount in the first environment including the first devices of a plurality of function types is associated with the varied number of the first devices in a case where the number of first devices for each function type varies in the first environment. The relation data may be prepared for each classification class.

An example where there are two function types of the HMI and the PLC ($F_1$=HMI, $F_2$=PLC, n=2) will be described below for explanation. If formula 5 is expanded, the following formula 9 is obtained.

[Math. 9]

$$P(C_1, C_2) = \alpha_{1,2}C_i C_2 + \alpha_1 C_1 + \alpha_2 C_2 \quad (9)$$

Further, if, for example, the number of PLC devices is two ($C_2$=2), the following formula 10 is obtained.

[Math. 10]

$$P(C_1, 2) = 2\alpha_{1,2}C_1 + \alpha_1 C_1 + 2\alpha_2 \quad (10)$$

Figure 19:
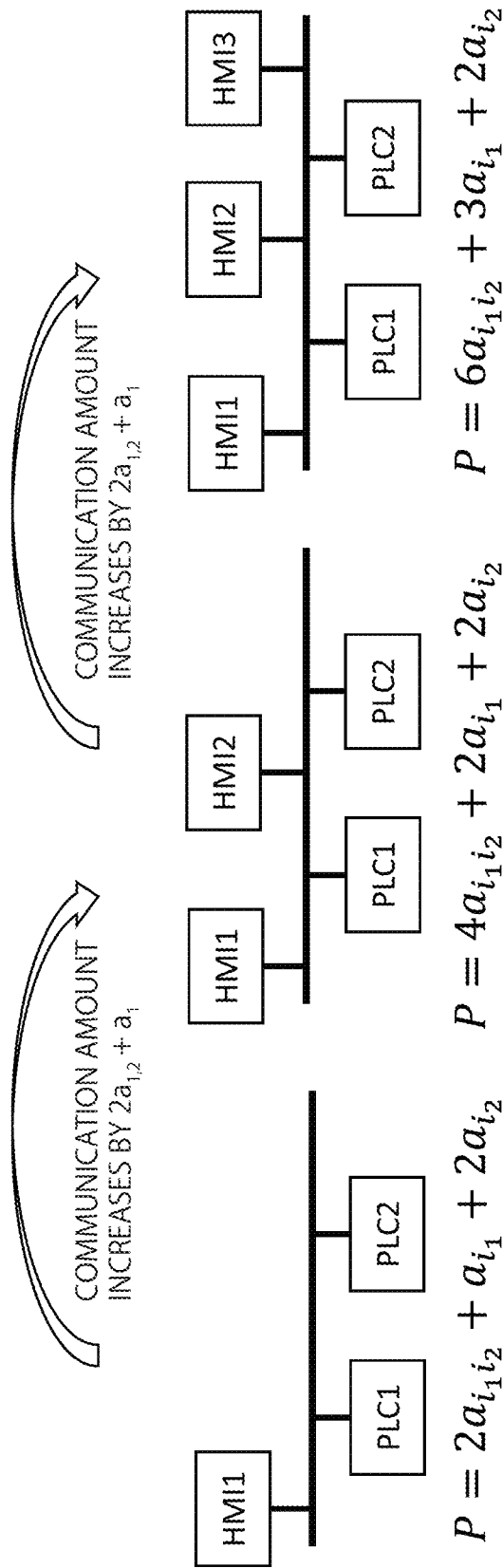
FIG. 19 is a view for explaining how the number of packets increases in a case where function types increase.

It can be seen that formula 10 is a linear function of $C_1$. As indicated in FIG. 19, in a case where only the number of HMI devices increases, the number of packets from the whole HMI devices increases in accordance with a linear function (in increments of $2a_{1,2}+a_1$).

Formula 5 corresponds to a function of summing up a plurality of terms (e.g. $C_1C_2$, $C_2C_3$) multiplied by coefficients (e.g., $a_{1,2}$, $a_{2,3}$), the terms corresponding to combinations of a plurality of function types. The plurality of terms each indicates multiplication of the numbers of first devices for the function types in the combination corresponding to the term.

Here, the packet number predictor 109 obtains the coefficient a in the function of formula 5. As a result of this, the number of packets P in the second environment is obtained. For example, in a case where n=2, if $a_{1,2}$, $a_1$, $a_2$ are known, the number of packets P ($C_1$, $C_2$) in the second environment is obtained whatever the values of $C_1$ and $C_2$. To obtain $a_{1,2}$, $a_1$, $a_2$, it is only necessary to solve a simultaneous equation as indicated in the following formula 11 by assigning a value such as ($C_1$, $C_2$)=(1, 1), (2, 1), (1, 2), (2, 2) to formula 5. In this example, there are three unknown variables, and thus, values of the variables may be determined by utilizing three formulas out of the following four formulas, or the values of the variables that make an error the smallest may be determined by utilizing the four formulas.

[Math. 11]

$$\alpha_{1,2}+\alpha_1+\alpha_2=P \quad (1,1)$$

$$\alpha_{1,2}+\alpha_1+\alpha_2=P(1,1)$$

$$2\alpha_{1,2}+\alpha_1+2\alpha_2=P(1,2) \quad (11)$$

$$4\alpha_{1,2}+2\alpha_1+2\alpha_2=P(2,2)$$

The packet number predictor 109 can predict the number of packets in the second environment 20 on the basis of formula 9 using the calculated each coefficient a and values (respectively, 3) of the second environment 20 as the values of $C_1$ and $C_2$.

Second Embodiment

Figure 20:
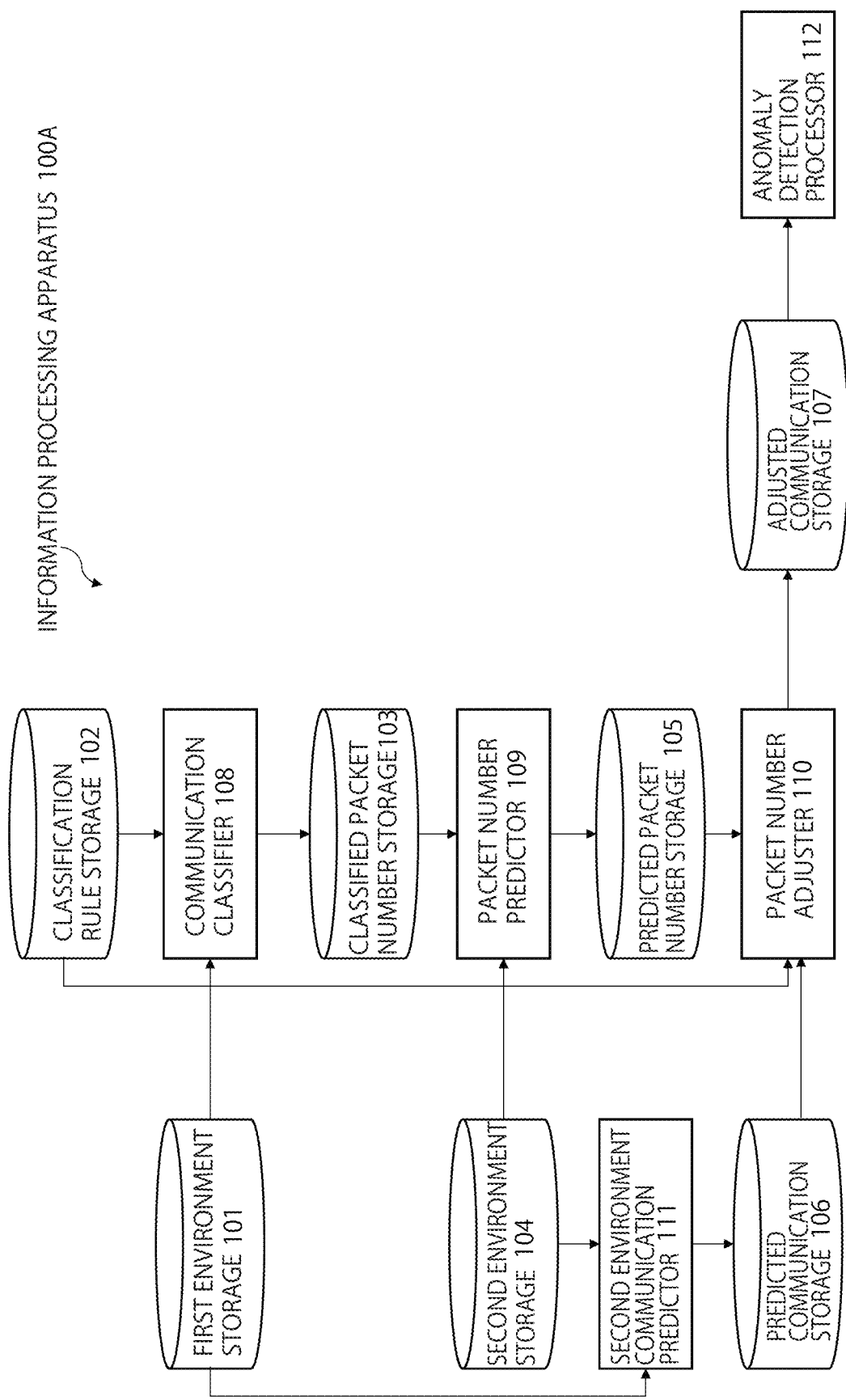
FIG. 20 is a block diagram of an example of an information processing apparatus according to a second embodiment.

FIG. 20 is a block diagram of an example of an information processing apparatus 100A according to a second embodiment. An anomaly detection processor 112 is added with respect to the information processing apparatus 100 according to the first embodiment.

Figure 21:
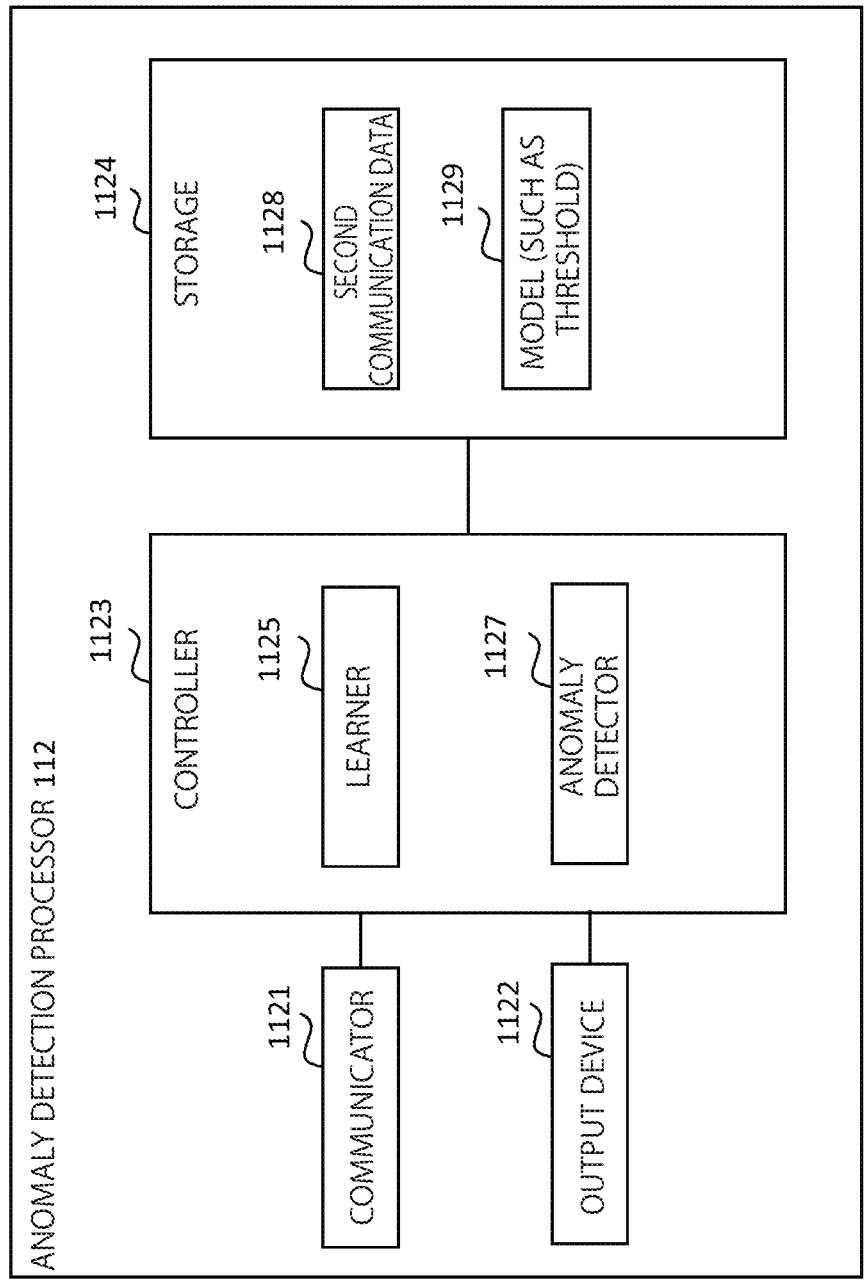
FIG. 21 is a block diagram illustrating a configuration example of an attack detection learner.

FIG. 21 is a block diagram illustrating a configuration example of the anomaly detection processor 112. The anomaly detection processor 112 has a function of creating a model that performs anomaly detection on the basis of the communication data for which the number of packets has been adjusted obtained in the first embodiment, and a function of performing anomaly detection on the basis of the model. The anomaly detection processor 112 includes a communicator 1121, an output device 1122, a controller 1123, and a storage 1124.

The communicator 1121 is a communication interface that transmits/receives information or data to/from other apparatuses connected via a network. For example, the communicator 1121 acquires the communication data for which the number of packets in the second environment 20 has been adjusted from the information processing apparatus 100 according to the first embodiment. Further, the communicator 1121 acquires communication data (second communication data) measured in the second environment 20. The communicator 1121 may acquire the second communication data by directly receiving (capturing) data to be transmitted/received at the second device in the second environment 20 or may acquire the second communication data from an apparatus such as a server that manages the communication data measured in the second environment.

The storage 1124 stores the acquired second communication data (second communication data 1128 in FIG. 21). The storage 1124 is a storage medium such as, for example, a RAM, a flash memory and an optical disk.

The controller 1123 includes a learner 1125 and an anomaly detector 1127.

The learner 1125 generates a model (model 1129 in FIG. 21) that detects an anomaly in the second environment 20 on the basis of the communication data for which the number of packets in the second environment 20 has been adjusted. As an example, the learner 1125 generates a threshold for determining the number of packets as a model 1129. For example, a value obtained by adding a fixed value to the number of packets included in the communication data for which the number of packets has been adjusted is set as the threshold. Alternatively, the learner 1125 may generate a regression model such as a neural network as a model for anomaly detection through machine learning. Alternatively, a threshold for determining an average of a ratio of the number of packets among the classification classes may be set as the model 1129. For example, a fixed range with respect to the ratio of the number of packets of each classification class in the communication data for which the number of packets has been adjusted is determined as a normal range (an upper limit threshold and a lower limit threshold). The learner 1125 may generate the model 1129 for each classification class. In a case where the number of packets in the second environment 20 is adjusted without distinction among the classification classes, the model 1129 is generated without distinction among the classification classes. In the following description, a case will be described where a threshold is generated as the model 1129.

The anomaly detector 1127 compares the threshold with the number of packets in the second environment acquired at the communicator 1121. The anomaly detector 1127 performs comparison with the threshold for each classification class. In a case where the number of packets is equal to or greater than the threshold in at least one classification class, the anomaly detector 1127 detects that an anomaly occurs in the second environment. Alternatively, the anomaly detector 1127 may calculate a ratio of the number of packets for each classification class and may detect occurrence of an anomaly in a case where the ratio in at least one classification class deviates from the normal range (range between the upper limit threshold and the lower limit threshold).

The output device 1122, which is, for example, a liquid crystal display or a printer, outputs various kinds of information. The output device 1122 may output information indicating that an anomaly such as, for example, a cyber attack is detected. The output device 1122 may output information indicating the classification class in which an anomaly is detected.

While in the example in FIG. 20, the anomaly detection processor 112 in the second embodiment is incorporated into the information processing apparatus 100 in the first embodiment, the anomaly detection processor 112 may be an apparatus independent of the information processing apparatus 100. Further, a learning function and an anomaly detection function in the anomaly detection processor 112 may be respectively provided as different apparatuses.

As described above, according to the second embodiment, by using the predicted adjusted number of packets in the second environment in learning of anomaly detection, it is possible to shorten a learning period of anomaly detection. Further, it is possible to improve accuracy of anomaly detection.

HARDWARE CONFIGURATION

Figure 22:
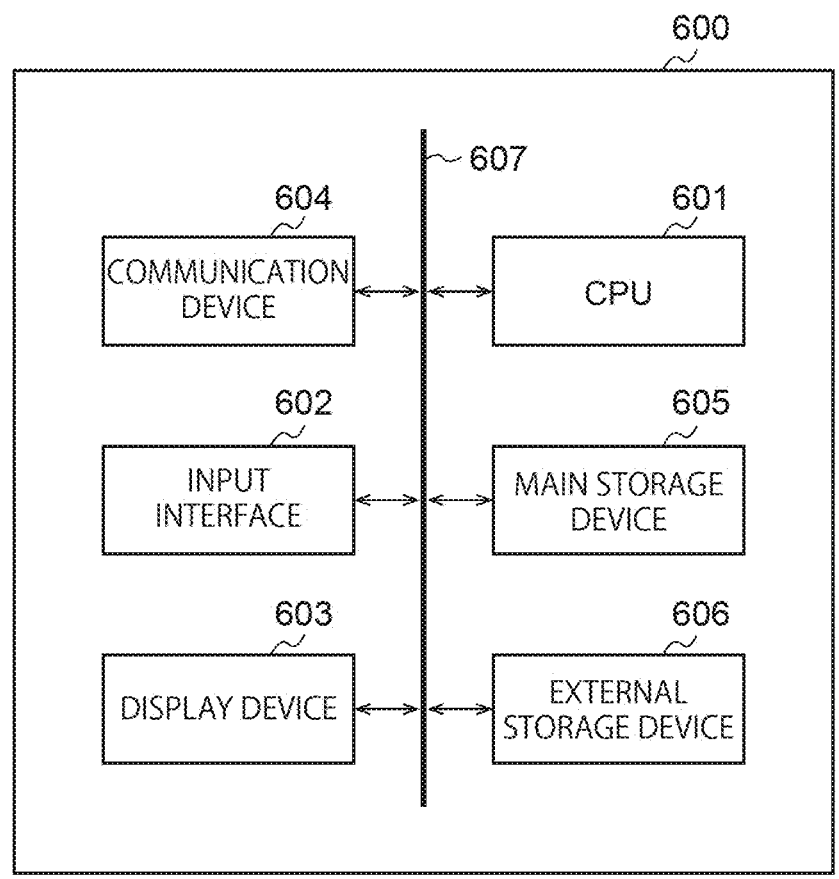
FIG. 22 is a view illustrating a hardware configuration of the information processing apparatus according to each embodiment.

FIG. 22 illustrates a hardware configuration of the information processing device according to each embodiment. The information processing device is configured as a computer device 600. The computer device 600 includes a CPU 601, an input interface 602, a display device 603, a communication device 604, a main storage device 605, and an external storage device 606, and these components are mutually connected through a bus 607.

The CPU (central processing unit) 601 executes an information processing program as a computer program on the main storage device 605. The information processing program is a computer program configured to achieve each above-described functional component of the present device. The information processing program may be achieved by a combination of a plurality of computer programs and scripts instead of one computer program. Each functional component is achieved as the CPU 601 executes the information processing program.

The input interface 602 is a circuit for inputting, to the present device, an operation signal from an input device such as a keyboard, a mouse, or a touch panel. The input interface 602 corresponds to the input device in each embodiment.

The display device 603 displays data output from the present device. The display device 603 is, for example, a liquid crystal display (LCD), an organic electroluminescence display, a cathode-ray tube (CRT), or a plasma display (PDP) but is not limited thereto. Data output from the computer device 600 can be displayed on the display device 603. The display device 603 corresponds to the output device in each embodiment.

The communication device 604 is a circuit for the present device to communicate with an external device in a wireless or wired manner. Data can be input from the external device through the communication device 604. The data input from the external device can be stored in the main storage device 605 or the external storage device 606.

The main storage device 605 stores, for example, the information processing program, data necessary for execution of the information processing program, and data generated through execution of the information processing program. The information processing program is loaded and executed on the main storage device 605. The main storage device 605 is, for example, a RAM, a DRAM, or an SRAM but is not limited thereto. Each storage or database in the information processing device in each embodiment may be implemented on the main storage device 605.

The external storage device 606 stores, for example, the information processing program, data necessary for execution of the information processing program, and data generated through execution of the information processing program. The information processing program and the data are read onto the main storage device 605 at execution of the information processing program. The external storage device 606 is, for example, a hard disk, an optical disk, a flash memory, or a magnetic tape but is not limited thereto. Each storage or database in the information processing device in each embodiment may be implemented on the external storage device 606.

The information processing program may be installed on the computer device 600 in advance or may be stored in a storage medium such as a CD-ROM. Moreover, the information processing program in each embodiment may be uploaded on the Internet.

The present device may be configured as a single computer device 600 or may be configured as a system including a plurality of mutually connected computer devices 600.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing apparatus implemented by a computer including a processing circuitry and a memory, the processing circuitry comprising:
　a communication amount predictor that
　　acquires first packets communicated among first devices in each of a plurality of first environments including each different number of the first devices of a plurality of function types, each first packet including a transmission source address and a transmission destination address,
　　acquires relation data indicating a number of the first packets by which the number of the first packets communicated among the first devices varies, in a case where the number of the first devices of each of the function types in each first environment increases by a predetermined number and the number of the first devices of the other function types does not increase and decrease,
　　acquires information of a second environment which includes a plurality of second devices of the plurality of function types, the information of the second environment including the function type and an address of each second device, and
　　predicts a number of packets communicated between the second devices in the second environment based on the relation data and the number of second devices per function type; and
　a communication predictor that replaces the source address and the destination address of each of the first packets obtained from one or more of the first environments with the address of any second device of same functional type as the first device having the source address and the address of any second device of same functional type as the first device having the destination address, and generates a plurality of predicted packets that are expected to be communicated between the second devices in the second environment by the number of packets predicted by the communication amount predictor.

2. The information processing apparatus according to claim 1,
　wherein the communication amount predictor
　　selects the first environment where a number of the first device of each of the functional types is one,
　　calculates, for each of the function types, a difference between the number of the first devices of the function type in the first environment and the number of the second devices of same function type as the function type in the second environment, multiplies, for each of the function types, the difference and a variation amount of the number of the first packets varied in a case where the number of the first devices of the function type increases by one in the environment, and adds a multiplied value between the difference and the variation amount for each of the function types to the number of the first packets in the first environment in which the number of the first devices of each of the function types is one, to thereby obtain the number of packets communicated in the second environment.

3. The information processing apparatus according to claim 1, wherein the number of the first devices in each of the first environments is one or two for each of the function types.

4. The information processing apparatus according to claim 1, wherein the communication amount predictor calculates coefficients for a plurality of terms corresponding to combinations of the function types on a basis of the first packets communicated among the first devices in the first environment, the function being a function of summing up the terms multiplied by the coefficients, the terms each indicating a multiplied value of the numbers of first devices in the corresponding combination of the function types, and the communication amount predictor predicts the number of packets communicated among the second devices in the second environment on a basis of the calculated coefficients and the numbers of the second devices for the function types in the second environment.

5. The information processing apparatus according to claim 1, wherein the processing circuitry further comprises:

a communication classifier that classifies the first packets among the first devices in the first environments into a plurality of classification classes, wherein the communication amount predictor predicts the number of the packets in the second environment for each of the classification classes.

6. The information processing apparatus according to claim 5, wherein the communication classifier classifies the first packets on a basis of the function type of each of two first devices having a transmission source address and a transmission destination address in the first packet.

7. The information processing apparatus according to claim 6, wherein the communication classifier classifies the first packets on a basis of at least one of a value of a payload portion of the first packets or a communication protocol of the first packets.

8. The information processing apparatus according to claim 1, wherein the communication amount predictor is configured to selectively turn on or off a plurality of first devices in a certain environment including the plurality of first devices for each of the function types, and thereby generate the plurality of first environment in sequence.

9. The information processing apparatus according to claim 1, wherein the processing circuitry further comprises:

a communication amount adjuster that if the number of the first packets acquired is less than the predicted number of packets, duplicates at least a portion of the predicted packets are duplicated to obtain predicted packets for the predicted number of packets, or if the number of the first packets acquired is greater than the predicted number of packets, discards at least a portion of the predicted packets to obtain predicted packets for the predicted number of packets.

10. The information processing apparatus according to claim 9, wherein the processing circuitry further comprises:

a learner that generates a model that detects an anomaly in the second environment on a basis of the plurality of predicted packets.

11. The information processing apparatus according to claim 10, wherein the processing circuitry further comprises:

a communicator that communicate with the second devices in the second environment and receives the second packets from the second devices in the second environment; and an anomaly detector that detects an anomaly of the second environment on a basis of the received second packets and the model.

12. The information processing apparatus according to claim 5, wherein the communication amount predictor predicts a value based on a ratio between a number of first packets in each of the plurality of classification classes and a total of a number of first packets in the plurality of classification classes.

13. An information processing method comprising:

acquiring first packets communicated among first devices in each of a plurality of first environments including each different number of the first devices of a plurality of function types, each first packet including a transmission source address and a transmission destination address;

acquiring relation data indicating a number of the first packets by which the number of the first packets communicated among the first devices varies, in a case where the number of the first devices of each of the function types in each first environment increases by a predetermined number and the number of the first devices of the other function types does not increase and decrease;

acquiring information of a second environment which includes a plurality of second devices of the plurality of function types, the information of the second environment including the function type and an address of each second device; and predicting a number of packets communicated between the second devices in the second environment based on the relation data and the number of second devices per function type; and replacing the source address and the destination address of each of the first packets obtained from one or more of the first environments with the address of any second device of same functional type as the first device having the source address and the address of any second device of same functional type as the first device having the destination address, and generating a plurality of predicted packets that are expected to be communicated between the second devices in the second environment by the number of packets.

14. A non-transitory computer readable medium having a computer program stored therein which when executed by a computer, causes the computer to perform processes comprising:

acquiring first packets communicated among first devices in each of a plurality of first environments including each different number of the first devices of a plurality of function types, each first packet including a transmission source address and a transmission destination address;

acquiring relation data indicating a number of the first packets by which the number of the first packets communicated among the first devices varies, in a case where the number of the first devices of each of the function types in each first environment increases by a predetermined number and the number of the first devices of the other function types does not increase and decrease;

acquiring information of a second environment which includes a plurality of second devices of the plurality of function types, the information of the second environment including the function type and an address of each second device;

predicting a number of packets communicated between the second devices in the second environment based on the relation data and the number of second devices per function type;

replacing the source address and the destination address of each of the first packets obtained from one or more of the first environments with the address of any second device of same functional type as the first device having the source address and the address of any second device of same functional type as the first device having the destination address, and generating a plurality of predicted packets that are expected to be communicated between the second devices in the second environment by the number of packets predicted by the communication amount predictor; and generating a model that detects an anomaly in the second environment on a basis of the plurality of predicted packets.

* * * * *

UNITED STATES PATENT AND TRADEMARK OFFICE
CERTIFICATE OF CORRECTION

PATENT NO. : 12,107,735 B2
APPLICATION NO. : 17/929737
DATED : October 1, 2024
INVENTOR(S) : Tomonori Maeda et al.

Page 1 of 1

It is certified that error appears in the above-identified patent and that said Letters Patent is hereby corrected as shown below:

In the Claims

• In Claim 2, Column 18, Lines 61-62, "a number of the first device" should read --a number of the first devices--.

• In Claim 8, Column 19, Line 61, "the plurality of first environment" should read --the plurality of first environments--.

• In Claim 9, Column 19, Line 67, to Column 20, Line 2, "duplicates at least a portion of the predicted packets are duplicated to obtain" should read --duplicates at least a portion of the predicted packets to obtain--.

• In Claim 11, Column 20, Line 18, "a communicator that communicate" should read --a communicator that communicates--.

• In Claim 11, Column 20, Lines 19-20, "receives the second packets" should read --receives second packets--.

Signed and Sealed this
Tenth Day of December, 2024

Katherine Kelly Vidal
*Director of the United States Patent and Trademark Office*